US010203263B2

United States Patent
Sun et al.

(10) Patent No.: US 10,203,263 B2
(45) Date of Patent: Feb. 12, 2019

(54) AIR-TIGHTNESS TEST EQUIPMENT FOR TURBINE REDUCTION GEARBOX

(71) Applicant: ZHEJIANG LINIX MOTOR CO., LTD., Dongyang, Zhejiang (CN)

(72) Inventors: Zhubing Sun, Zhejiang (CN); Ronghua Jin, Zhejiang (CN); Shan Du, Zhejiang (CN)

(73) Assignee: ZHEJIANG LINIX MOTOR CO., LTD., Dongyang, Zhejiang (CN)

( * ) Notice: Subject to any disclaimer, the term of this patent is extended or adjusted under 35 U.S.C. 154(b) by 291 days.

(21) Appl. No.: 15/168,037

(22) Filed: May 28, 2016

(65) Prior Publication Data

US 2017/0059443 A1  Mar. 2, 2017

(30) Foreign Application Priority Data

Aug. 27, 2015  (CN) .......................... 2015 1 0534368

(51) Int. Cl.
*G01M 3/32* (2006.01)
*F04B 51/00* (2006.01)
(Continued)

(52) U.S. Cl.
CPC ............... *G01M 3/32* (2013.01); *F04B 51/00* (2013.01); *G01M 13/02* (2013.01); *F02C 7/36* (2013.01)

(58) Field of Classification Search
CPC ..... G01M 3/025; G01M 15/02; F01D 21/003; F04B 51/00
See application file for complete search history.

(56) References Cited

U.S. PATENT DOCUMENTS 4,970,899 A * 11/1990 Huang .................... G01L 7/166
73/744
5,495,750 A * 3/1996 Dufresne ............ G01M 3/2853
73/40.5 R
(Continued)

FOREIGN PATENT DOCUMENTS

| CN | 101275755 A | * | 10/2008 |
| CN | 104634513 A | * | 5/2015 |
| CN | 204479250 U | * | 7/2015 |

*Primary Examiner* — Son Le
*Assistant Examiner* — Marrit Eyassu
(74) *Attorney, Agent, or Firm* — Global IP Services; Tianhua Gu

(57) ABSTRACT

The present invention discloses air-tightness test equipment for a turbine reduction gearbox, comprising a base, characterized in that a product mounting plate is arranged and fixed on the base by a support frame, the product mounting plate is provided with a product positioning slot having an opening on its one side; a compression cylinder is arranged over the product mounting plate by a cylinder support plate, the compression cylinder is vertically arranged, and a piston rod of the compression cylinder faces downward and a sealed connector corresponding to the upper part of the product positioning slot is fixed at the lower end of the piston rod; the sealed connector has a cavity in which an inflator is arranged, and the inflator is connected with an inflator pump by a pipeline; the inflator pump is provided with a gas filtration device, the pipeline is provided with a gas valve, and a gas pressure sensor is arranged on the pipeline between the gas valve and the inflator; the compression cylinder, the inflator pump, the gas valve and the gas pressure sensor are connected to a controller, respectively.

12 Claims, 2 Drawing Sheets

(51) Int. Cl.
  *G01M 13/02*     (2006.01)
  *F02C 7/36*      (2006.01)

(56) References Cited

U.S. PATENT DOCUMENTS

| | | | | |
|---|---|---|---|---|
| 7,430,900 B2* | 10/2008 | Belanger | ............... | B60C 23/04 |
| | | | | 340/442 |
| 2004/0155516 A1* | 8/2004 | Colussi | ............... | B60C 23/003 |
| | | | | 301/5.24 |
| 2007/0087946 A1* | 4/2007 | Quest | ............... | C10M 171/007 |
| | | | | 508/433 |
| 2009/0132185 A1* | 5/2009 | Furuse | ............... | G01M 3/3263 |
| | | | | 702/51 |
| 2010/0322786 A1* | 12/2010 | Dos Santos | ........... | F15B 21/048 |
| | | | | 417/63 |
| 2012/0118055 A1* | 5/2012 | Keister | ............... | G01M 15/02 |
| | | | | 73/116.02 |
| 2014/0182354 A1* | 7/2014 | Jiang | ............... | G01L 27/005 |
| | | | | 73/1.63 |
| 2014/0338427 A1* | 11/2014 | Yamaguchi | ........... | G01M 3/025 |
| | | | | 73/40 |

\* cited by examiner

AIR-TIGHTNESS TEST EQUIPMENT FOR TURBINE REDUCTION GEARBOX

TECHNICAL FIELD OF THE INVENTION

The present invention relates to the field of test equipment, and in particular to air-tightness test equipment for a turbine reduction gearbox.

BACKGROUND OF THE INVENTION

During the usage of a turbine reduction gearbox, sometimes, oil leakage may be caused by defects such as the presence of sand holes, fine cracks and the like on the gearbox body or by insufficient tightness of the cover. In order to avoid the potential oil leakage of a turbine reduction gearbox during the operation, it is desired to perform an air-tightness test on the turbine reduction gearbox. In order to test the air-tightness of a turbine reduction gearbox, testers usually tests the air-tightness of the turbine reduction gearbox by immersing it in water. However, since whether the gearbox is tight or not depends upon a long period of observation by the testers, the automatic testing cannot be realized, and the labor intensity of the testers is increased. Sometimes, a component under test may be mistakenly regarded as qualified when bubbles are adsorbed on the bottom of the turbine reduction gearbox. Furthermore, immersing in water may cause adverse effects, for example, rusting of irony members such as worm wheels and worms.

SUMMARY OF THE INVENTION

An objective of the present invention is to provide air-tightness test equipment for a turbine reduction gearbox, which can perform an air-tightness test on a turbine reduction gearbox, with easy and convenient test mode and high test precision.

To achieve this objective, the present invention adopts the following technical solutions. Air-tightness test equipment for a turbine reduction gearbox is provided, including a base; a product mounting plate is arranged and fixed on the base by a support frame, the product mounting plate is provided with a product positioning slot having an opening on its one side; a compression cylinder is arranged over the product mounting plate by a cylinder support plate, the compression cylinder is vertically arranged, and a piston rod of the compression cylinder faces downward and a sealed connector corresponding to the upper part of the product positioning slot is fixed at the lower end of the piston rod; the sealed connector has a cavity in which an inflator is arranged, and the inflator is connected with an inflator pump by a pipeline; the inflator pump is provided with a gas filtration device, the pipeline is provided with a gas valve, and a gas pressure sensor is arranged on the pipeline between the gas valve and the inflator; and the compression cylinder, the inflator pump, the gas valve and the gas pressure sensor are connected to a controller, respectively, and the controller can control the compression cylinder, the inflator pump, the gas valve and the gas pressure sensor.

The test process of the turbine reduction gearbox is as follows: the turbine reduction gearbox housing is fixed by the positioning slot and the compression cylinder, air and pressure are applied into the turbine reduction gearbox housing by the inflator pump, the gas pressure is hold by the gas valve, and a gas pressure value after the gas pressure holding is obtained by the gas pressure sensor. The gas pressure value after the gas pressure holding is compared with a set standard gas pressure value after the gas pressure holding, so as to test the air-tightness of the turbine reduction gearbox. The compression cylinder, the inflator pump, the gas valve and the gas pressure sensor are connected with the controller, respectively, and are controlled by the controller so that the test automation of the turbine reduction gearbox can be realized. The inflator pump is provided with a gas filtration device by which impurities in air can be prevented from entering the turbine reduction gearbox to damage the worm wheel, the worm and the housing.

Preferably, the control process of the controller is as follows: a sealing washer is placed inside a flange structure of a turbine reduction gearbox housing; the turbine reduction gearbox housing is clamped on the product mounting plate by an opening of the product positioning slot; the compression cylinder is started by the controller, so that the sealed connector of the compression cylinder moves downward to resist against the sealing washer inside the flange structure and compress the turbine reduction gearbox on the product mounting plate; then, the controller controls the inflator pump to allow the inflator to inflate the turbine reduction gearbox, and the controller controls the gas valve to close after a duration of a so as to hold the gas pressure for a duration of b; and a test result is obtained by the gas pressure sensor at the end of gas pressure holding. The sealing washer can ensure the precision of the air-tightness test of the turbine reduction gearbox and prevent the air entering the turbine reduction gearbox from excessively running away. The air-tightness test of the turbine reduction gearbox can be completed by the controller as long as a product is fixed, which is easy and convenient.

Preferably, the gas pressure sensor is connected with a buzzer by the controller and the buzzer is controlled by an electrical signal which is transferred to the controller by the gas pressure sensor.

An upper limit and a lower limit of a gas pressure standard in the turbine reduction gearbox housing after the gas pressure holding are set by the controller, when a gas pressure value measured by the gas pressure sensor after the gas pressure holding is lower than the lower limit, the buzzer will alert, which indicates that the air-tightness of the turbine reduction gearbox housing is not qualified; and when the gas pressure value measured by the gas pressure sensor after the gas pressure holding is between the upper limit and the lower limit, the buzzer will not alert, which indicates that the air-tightness of the turbine reduction gearbox housing is qualified. A signal indicating the gas pressure inside the turbine reduction gearbox housing is transferred to the controller by the gas pressure sensor after the gas pressure holding, and the controller controls the buzzer upon receiving the signal. The alerting sound can be set to be sharp and urgent.

Preferably, the gas pressure sensor is connected with a real-time gas pressure value display device, and the real-time gas pressure value display device is a digital real-time gas pressure display meter. The tester can know the process of the inflating and the gas pressure holding by the digital real-time gas pressure display meter. Whether the air-tightness of the turbine reduction gearbox is qualified or not can be determined by comparing the displayed gas pressure value and the standard gas pressure value after the gas pressure holding.

Preferably, the cylinder support plate is located on the left and right sides of the sealed connector and a vertically arranged guide slot is provided on the cylinder support plate; a compression cylinder guide connection rod is fixed on the left and right sides of the sealed connector; and one end of the compression cylinder guide connection rod is located in the guide slot. The arrangement mentioned above can ensure the alignment of the sealed connector and the sealing washer in the flange structure, so that the test precision of the present invention is ensured.

Preferably, the controller is a programmable logic controller; an inflation duration of the inflator pump, a gas pressure holding duration after closing the gas valve, and an upper limit and a lower limit of gas pressure after the gas pressure holding can be set by the programmable logic controller; and the programmable logic controller is connected with a time display relay which can display the inflation duration and the gas pressure holding duration.

Preferably, the base is provided with a switch control box, the switch control box is provided with a pneumatic switch and an emergency switch, and the pneumatic switch and the emergency switch are connected with the controller; the pneumatic switch can control the starting of the compression cylinder, the inflator pump and the gas valve by the controller; and the emergency switch can control the stopping of the inflator pump, the resetting of the gas valve and the resetting of the compression cylinder by the controller.

Preferably, the gas pressure sensor is connected with an indicator light by the controller, the indicator light is controlled by an electrical signal which is transferred to the controller by the gas pressure sensor, and the indicator light at least includes a red light and a green light.

An upper limit and a lower limit of the gas pressure standard in the turbine reduction gearbox housing after the gas pressure holding are set by the controller; when the gas pressure value in the turbine reduction gearbox housing measured by the gas pressure sensor after the gas pressure holding is lower than the lower limit, the red light will turn on, which indicates that the air-tightness of the turbine reduction gearbox housing is not qualified; and when the gas pressure value in the turbine reduction gearbox housing measured by the gas pressure sensor after the gas pressure holding is between the upper limit and the lower limit, the green light will turn on, which indicates that the air-tightness of the turbine reduction gearbox housing is qualified. The buzzer and the indicator light can vividly display the test results. The labor intensity of the testers is alleviated, and it is not required to compare the gas pressure value by testers.

Preferably, the compression cylinder is provided with a compression pressure sensor which can measure the compression pressure; the compression pressure sensor is connected with a pointer-type compression pressure meter; and the compression cylinder is connected with a compression pressure regulating valve by which the amount of compression pressure of the compression cylinder can be regulated.

Preferably, the inflator pump is provided with an inflation pressure sensor which can measure the inflation pressure; the inflation pressure sensor is connected with a pointer-type inflation pressure meter; and the inflator pump is connected with an inflation pressure regulating valve by which the amount of inflation pressure of the inflation pressure regulating valve can be regulated.

The tester can allow the compression cylinder to better compress and fix the turbine reduction gearbox by the compression pressure sensor and the compression pressure regulating valve, so that the compression of the sealing washer can be ensured, the gas leakage loss and the like caused by external factors can be eliminated, and the precision of the air-tightness test of the present invention can be improved; the pointer-type inflation pressure meter and the inflation pressure regulating valve can ensure the precision of the verified air-intake data; and a high-precision regulating valve which can be controlled to 0.001 Mpa can be selected as the compression pressure regulating valve and the inflation pressure regulating valve. The present invention is used for testing the air-tightness of a turbine reduction gearbox to avoid water leakage and oil leakage of a turbine reduction gearbox, and has the advantages of easy and convenient test and high test precision.

DETAILED DESCRIPTION OF THE INVENTION

Figure 1:
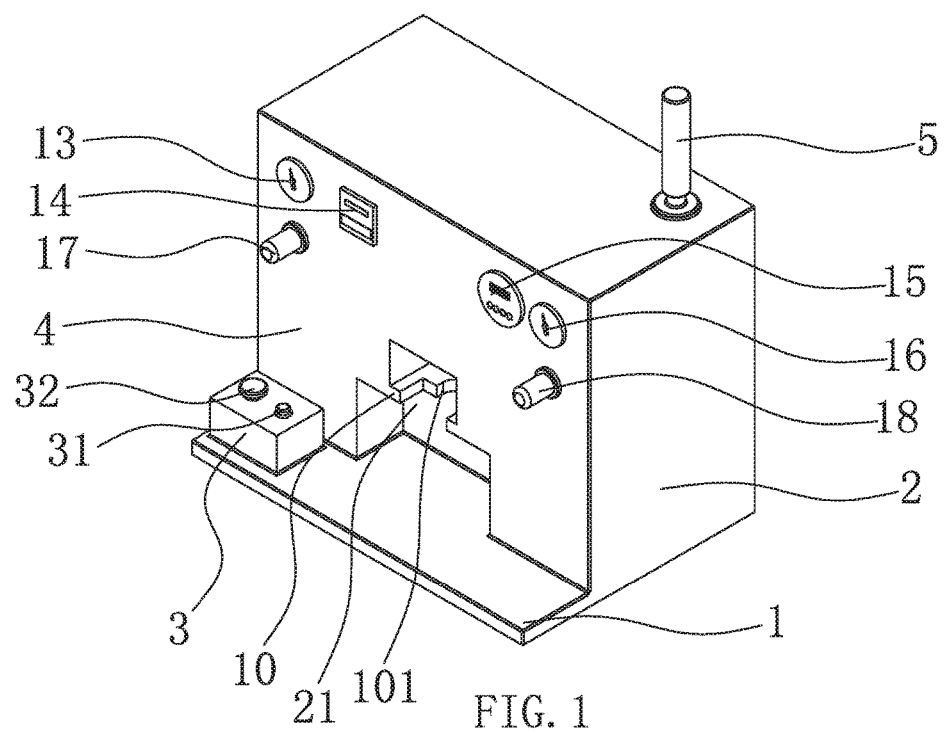
FIG. 1 is a schematic structure diagram of the present invention.
Figure 2:
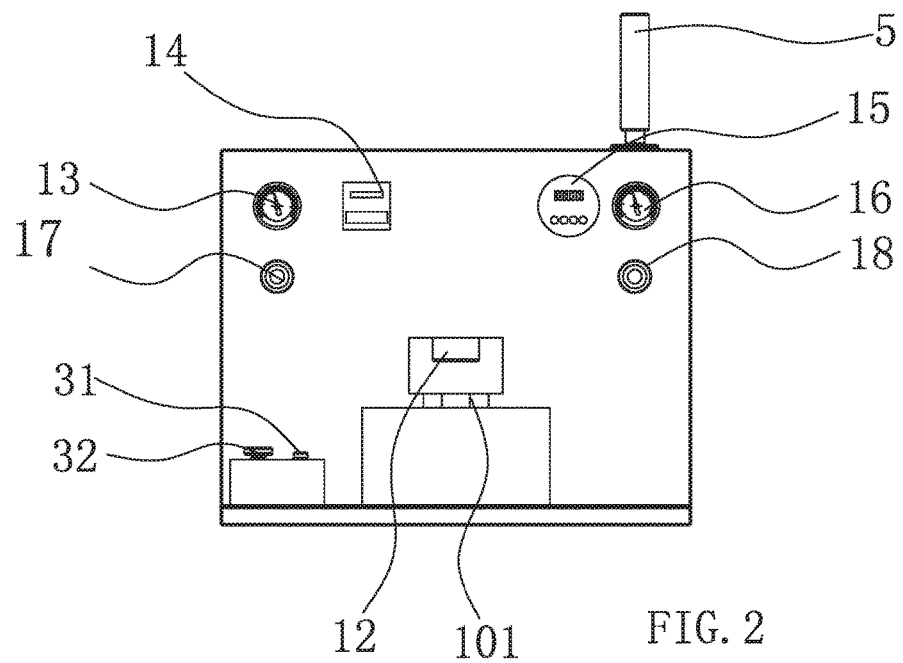
FIG. 2 is another schematic structure diagram of the present invention.
Figure 3:
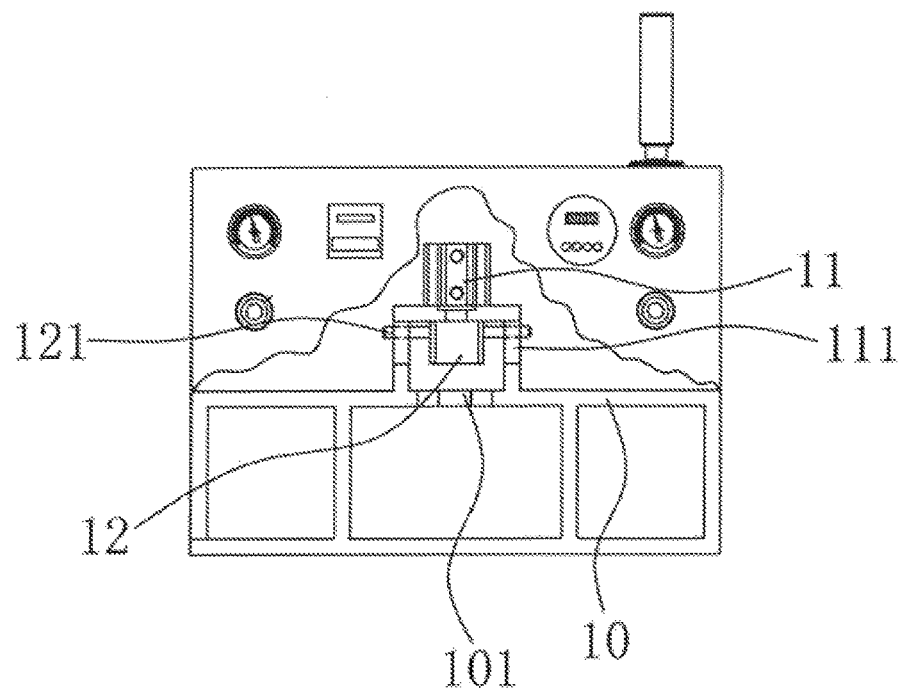
FIG. 3 is a sectional view of a test cavity portion according to the present invention.
Figure 4:
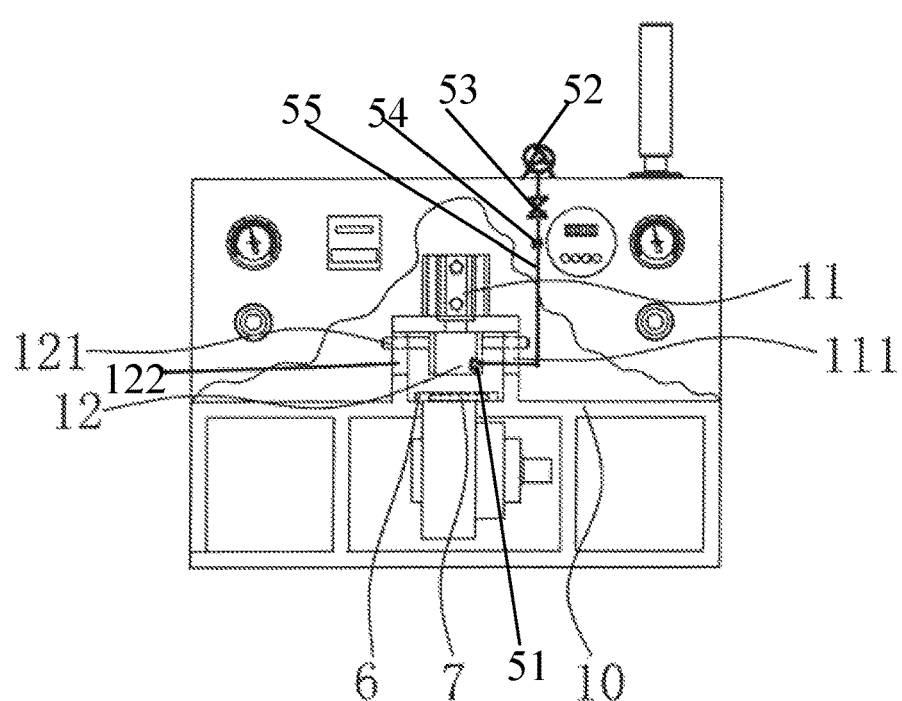
FIG. 4 is a schematic diagram for fixing the turbine reduction gearbox according to the present invention.

As shown in FIG. 1, air-tightness test equipment for a turbine reduction gearbox includes a base 1; an equipment housing 2 covers the base 1; a test cavity 21, a switch control box 3 and a control display panel 4 are arranged on the equipment housing 2; and an alarm 5 is arranged on the top right side of the equipment housing 2. The alarm 5 of the present invention includes an indicator light and a buzzer, wherein the indicator light includes a red display light, a yellow display light and a green display light.

As shown in FIG. 1, FIG. 2, FIG. 3 and FIG. 4, a product mounting plate 10 is arranged inside the test cavity in the present invention, the product mounting plate 10 is provided with a product positioning slot 101 having an opening, on its one side, matched with a flange structure of the turbine reduction gearbox. A compression cylinder 11 which is mounted and fixed by a cylinder support plate 111 is arranged over the product mounting plate 10, the compression cylinder 11 is vertically arranged, and a piston rod 112 of the compression cylinder 11 faces downward and a sealed connector 12 corresponding to the upper part of the product positioning slot 101 is fixed at the lower end of the piston rod 112. The cylinder support plate 111 is located on the left and right sides of the sealed connector 12 and a vertically arranged guide slot 122 is provided on the cylinder support plate 111; a compression cylinder guide connection rod 121 is fixed on the left and right sides of the sealed connector 12; and one end of the compression cylinder guide connection rod 121 is located in the guide slot 122. The sealed connector 12 has a cavity in which an inflator 51 is arranged, and the inflator 51 is connected with an inflator pump 52 outside the equipment housing by a pipeline 55. The inflator pump 52 is provided with a gas filtration device, the pipeline 55 is provided with a gas valve 53, and a gas pressure sensor 54 is arranged on the pipeline 55 between the gas valve 53 and the inflator 51. The compression cylinder, the inflator pump 52, the gas valve 53 and the gas pressure sensor 54 are connected to and controlled by a controller, respectively. The gas pressure sensor, the compression cylinder, the gas valve 53 and the controller are arranged inside the equipment housing, the controller is a programmable logic controller, and the inflator pump 52 is a high-pressure inflator pump 52. The controller can allow the buzzer to sound urgently, and turn on or switch between the yellow display light, the red display light and the green display light.

The switch control box 3 of the present invention is provided with a pneumatic switch 31 and an emergency switch 32, and the pneumatic switch 31 and the emergency switch 32 are connected with the controller; the pneumatic switch 31 can control the starting of the compression cylinder 11, the inflator pump 52 and the gas valve 53 by the controller; and the emergency switch 32 can control the stopping of the inflator pump 52, the resetting of the gas valve 53 and the resetting of the compression cylinder by the controller.

A pointer-type inflation pressure meter 13, a time display relay 14, a digital real-time gas pressure display meter 15 and a pointer-type compression pressure meter 16 are arranged on the control display panel 4 of the present invention successively from left to right; and an inflation pressure regulating valve 17 is arranged below the pointer-type inflation pressure meter 13 and a compression pressure regulating valve 18 is arranged below the pointer-type compression pressure meter 16.

The compression cylinder is provided with a compression pressure sensor 54 which can measure the compression pressure applied downward to the sealing washer by the sealed connector 12 below the compression cylinder 11; the compression pressure sensor 54 is connected with the pointer-type compression pressure meter 16; the pointer-type compression pressure meter 16 can display the value of the compression pressure measured by the compression pressure sensor, and the amount of the compression pressure of the compression cylinder 11 can be regulated by the compression pressure regulating valve 18.

The inflator pump 52 is provided with an inflation pressure sensor 54 which can measure the inflation pressure; the inflation pressure sensor 54 is connected with a pointer-type inflation pressure meter 13; and the pointer-type inflation pressure meter 13 can display the value of the inflation pressure measured by the inflation pressure sensor, and the amount of the inflation pressure of the inflator pump 52 can be regulated by an inflation pressure regulating valve 17.

The control process of the controller is as follows: a sealing washer is placed inside a flange structure of a turbine reduction gearbox housing; the turbine reduction gearbox housing is clamped on the product mounting plate by an opening of the product positioning slot; the pneumatic switch 31 is pressed down; the controller controls the compression cylinder 11 to start so that the sealed connector 12 of the compression cylinder 11 moves downward to resist against the sealing washer 7 inside the flange structure 6 and compress the turbine reduction gearbox on the product mounting plate 10; then, the controller controls the inflator pump 52 to allow the inflator 51 to inflate the turbine reduction gearbox, and the controller controls the gas valve 53 to close after a duration of a to hold the pressure for a duration of b; the gas pressure value inside the turbine reduction gearbox housing is tested by the gas pressure sensor 54 after the gas pressure holding; and according to different values, the indicator light of the alarm is controlled to turn on and the buzzer is controlled to sound.

The operation process of the present invention is as follows: (1) the power supply is turned on; an upper limit and a lower limit of the gas pressure standard in the turbine reduction gearbox housing after the gas pressure holding are set by the controller; the inflator pump 52 is set by the controller to start operating so that the yellow display light of the indicator light of the alarm turns on; the value of the gas pressure after the gas pressure holding is set by the controller below the lower limit, so that the buzzer sounds and the indicator light switches from the yellow display light to the red display light; the value of the gas pressure after the gas pressure holding is set by the controller between the upper limit and the lower limit, so that the indicator light switches from the yellow display light to the green display light; the inflation duration is set by the controller to be five seconds and the gas pressure holding duration to be twenty seconds; the compression pressure value of the compression cylinder 11 when compressing downward is set by the compression pressure regulating valve 18; the inflation pressure value of the inflator pump 52 is set by the inflation pressure regulating valve 17; (2) the sealing washer 7 is placed inside the flange structure 6 of the turbine reduction gearbox housing, and the turbine reduction gearbox housing is clamped on the product mounting plate 10 by an opening of the product positioning slot 101; (3) the tester presses the pneumatic switch down and the air-tightness test equipment of the present invention starts to operate; the sealed connector 12 moves downward to resist against the sealing washer and continuously moves downward to compress the turbine reduction gearbox housing onto the product mounting plate 10; during this process, the pointer-type compression pressure meter rotates, the inflator pump 52 starts to inflate and the yellow display light of the indicator light turns on; during this process, the pointer-type inflation pressure meter rotates, the digital real-time gas pressure display meter starts to display the gas pressure inside the turbine reduction gearbox housing, inflation is performed for a duration of five seconds, the gas valve 53 closes and the gas pressure is hold for a duration of twenty seconds, and then the value of the gas pressure inside the turbine reduction gearbox housing is tested by the gas pressure sensor; when the gas pressure value after the gas pressure holding is below the lower limit, the buzzer sounds and the indicator light switches from the yellow display light to the red display light; when the gas pressure value after the gas pressure holding is between the lower limit and the upper limit, the indicator light switches from the yellow display light to the green display light; (4) the pneumatic switch 31 is pressed down, the gas valve 53 is opened for pressure relief, and at the end of pressure relief, the sealed connector 12 of the compression cylinder 11 moves upward; the tester takes the turbine reduction gearbox housing and the sealing washer 7 out and sorts the turbine reduction gearbox; and (5) the steps in (2), (3) and (4) are repeated to perform an air-tightness test on a next turbine reduction gearbox.

In an emergency, the tester can press the emergency switch down. The inflator pump 52 stops inflating and the turbine reduction gearbox housing starts to discharging. At the end of discharging, the compression cylinder resets.

What is claimed is:

1. Air-tightness test equipment for a turbine reduction gearbox, comprising;
   a base;
   a product mounting plate arranged and fixed on the base by a support frame, the product mounting plate is provided with a product positioning slot having an opening on its one side;
   a compression cylinder arranged over the product mounting plate by a cylinder support plate, the compression cylinder is vertically arranged, and a piston rod of the compression cylinder faces downward;
   a sealed connector corresponding to an upper part of the product positioning slot fixed at a lower end of the piston rod, the sealed connector has a cavity;
   an inflator arranged in the cavity of the sealed connector, the inflator is connected with an inflator pump by a pipeline, the pipeline is provided with a gas valve;

a gas pressure sensor arranged on the pipeline between the gas valve and the inflator;

a controller for controlling the compression cylinder, the inflator pump, the gas valve and the gas pressure sensor;

wherein the cylinder support plate is located on the left and right sides of the sealed connector and has a vertically arranged guide slot; a compression cylinder guide connection rod is fixed on the left and right sides of the sealed connector, one end of the compression cylinder guide connection rod is located in the guide slot.

2. The air-tightness test equipment for a turbine reduction gearbox according to claim 1, characterized in that a control process of the controller is as follows: a sealing washer is placed inside a flange structure of a turbine reduction gearbox housing; the turbine reduction gearbox housing is clamped on the product mounting plate by an opening of the product positioning slot; the compression cylinder is started by the controller, so that the sealed connector of the compression cylinder moves downward to resist against the sealing washer inside the flange structure and compress the turbine reduction gearbox on the product mounting plate; then, the controller controls the inflator pump to allow the inflator to inflate the turbine reduction gearbox, and the controller controls the gas valve for an inflating duration and a pressure holding duration, and a test result is obtained by the gas pressure sensor at the end of gas pressure holding.

3. The air-tightness test equipment for a turbine reduction gearbox according to claim 2, characterized in that the gas pressure sensor is connected with a buzzer by the controller and the buzzer is controlled by an electrical signal which is transferred to the controller by the gas pressure sensor;

an upper limit and a lower limit of a gas pressure standard in the turbine reduction gearbox housing after the gas pressure holding are set by the controller, when a pressure value measured by the gas pressure sensor after the gas pressure holding is lower than the lower limit, the buzzer will alert, which indicates that the air-tightness of the turbine reduction gearbox housing is not qualified; and when the gas pressure value measured by the gas pressure sensor after the gas pressure holding is between the upper limit and the lower limit, the buzzer will not alert, which indicates that the air-tightness of the turbine reduction gearbox housing is qualified.

4. The air-tightness test equipment for a turbine reduction gearbox according to claim 2, characterized in that the gas pressure sensor is connected with a real-time gas pressure value display device, and the real-time gas pressure value display device is a digital real-time gas pressure display meter.

5. The air-tightness test equipment for a turbine reduction gearbox according to claim 1, characterized in that the gas pressure sensor is connected with a buzzer by the controller and the buzzer is controlled by an electrical signal which is transferred to the controller by the gas pressure sensor;

an upper limit and a lower limit of a gas pressure standard in the turbine reduction gearbox housing after the gas pressure holding are set by the controller, when a pressure value measured by the gas pressure sensor after the gas pressure holding is lower than the lower limit, the buzzer will alert, which indicates that the air-tightness of the turbine reduction gearbox housing is not qualified; and when the gas pressure value measured by the gas pressure sensor after the gas pressure holding is between the upper limit and the lower limit, the buzzer will not alert, which indicates that the air-tightness of the turbine reduction gearbox housing is qualified.

6. The air-tightness test equipment for a turbine reduction gearbox according to claim 5, characterized in that the gas pressure sensor is connected with a real-time gas pressure value display device, and the real-time gas pressure value display device is a digital real-time gas pressure display meter.

7. The air-tightness test equipment for a turbine reduction gearbox according to claim 1, characterized in that the gas pressure sensor is connected with a real-time gas pressure value display device, and the real-time gas pressure value display device is a digital real-time gas pressure display meter.

8. The air-tightness test equipment for a turbine reduction gearbox according to claim 1, characterized in that the controller is a programmable logic controller; an inflation duration of the inflator pump, a gas pressure holding duration after closing the gas valve, and an upper limit and a lower limit of pressure after the gas pressure holding can be set by the programmable logic controller; and the programmable logic controller is connected with a time display relay which can display the inflation duration and the gas pressure holding duration.

9. The air-tightness test equipment for a turbine reduction gearbox according to claim 1, characterized in that the base is provided with a switch control box, the switch control box is provided with a pneumatic switch and an emergency switch, and the pneumatic switch and the emergency switch are connected with the controller; the pneumatic switch can control the starting of the compression cylinder, the inflator pump and the gas valve by the controller; and the emergency switch can control the stopping of the inflator pump, the resetting of the gas valve and the resetting of the compression cylinder by the controller.

10. The air-tightness test equipment for a turbine reduction gearbox according to claim 1, characterized in that the gas pressure sensor is connected with an indicator light by the controller, the indicator light is controlled by an electrical signal which is transferred to the controller by the gas pressure sensor, and the indicator light at least comprises a red light and a green light;

an upper limit and a lower limit of the gas pressure standard in the turbine reduction gearbox housing after the gas pressure holding are set by the controller; when the gas pressure value in the turbine reduction gearbox housing measured by the gas pressure sensor after the gas pressure holding is lower than the lower limit, the red light will turn on, which indicates that the air-tightness of the turbine reduction gearbox housing is not qualified; and when the gas pressure value in the turbine reduction gearbox housing measured by the gas pressure sensor after the gas pressure holding is between the upper limit and the lower limit, the green light will turn on, which indicates that the air-tightness of the turbine reduction gearbox housing is qualified.

11. The air-tightness test equipment for a turbine reduction gearbox according to claim 1, characterized in that the compression cylinder is provided with a compression pressure sensor which can measure the compression pressure; the compression pressure sensor is connected with a pointer-type compression pressure meter; and the compression cylinder is connected with a compression pressure regulating valve by which the amount of compression pressure of the compression cylinder can be regulated.

12. The air-tightness test equipment for a turbine reduction gearbox according to claim 1, characterized in that the inflator pump is provided with an inflation pressure sensor which can measure the inflation pressure; the inflation pressure sensor is connected with a pointer-type inflation pressure meter; and the inflator pump is connected with an inflation pressure regulating valve by which the amount of inflation pressure of the inflator pump can be regulated.

\* \* \* \* \*